United States Patent
Ho et al.

(10) Patent No.: US 10,289,491 B1
(45) Date of Patent: May 14, 2019

(54) METHOD AND SYSTEM FOR IMPLEMENTING MULTI-DIMENSIONAL RAID IN AN EXTENSIBLE STORAGE ARRAY TO OPTIMIZE PERFORMANCE

(71) Applicant: EMC IP Holding Company LLC, Hopkinton, MA (US)

(72) Inventors: Grace Ho, Sunnyvale, CA (US); James Yarbrough, San Fransisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 63 days.

(21) Appl. No.: 15/581,431

(22) Filed: Apr. 28, 2017

(51) Int. Cl.
  *G06F 11/00* (2006.01)
  *G06F 11/10* (2006.01)
  *G06F 11/20* (2006.01)
  *G06F 3/06* (2006.01)

(52) U.S. Cl.
  CPC .......... *G06F 11/1096* (2013.01); *G06F 3/065* (2013.01); *G06F 3/0619* (2013.01); *G06F 3/0685* (2013.01); *G06F 11/2094* (2013.01); *G06F 2201/85* (2013.01)

(58) Field of Classification Search
  CPC .................................................. G06F 11/1096
  USPC .... 714/6.24, 6.1, 6.11, 6.12, 6.13, 6.2, 6.21, 714/6.22, 6.23, 6.3
  See application file for complete search history.

(56) References Cited

U.S. PATENT DOCUMENTS

| | | | |
|---|---|---|---|
| 5,708,668 A | 1/1998 | Styczinski | |
| 6,351,838 B1 | 2/2002 | Amelia | |
| 6,415,355 B1 | 7/2002 | Hirofuji | |
| 7,398,418 B2 | 7/2008 | Soran et al. | |
| 7,406,621 B2 | 7/2008 | Lubbers et al. | |
| 7,430,706 B1 | 9/2008 | Yuan et al. | |
| 7,543,100 B2 | 6/2009 | Singhal et al. | |
| 7,644,197 B1 | 1/2010 | Waldorf et al. | |

(Continued)

FOREIGN PATENT DOCUMENTS

| EP | 1577774 A2 | 9/2005 |
|---|---|---|
| JP | 2004-326759 A | 11/2004 |

(Continued)

OTHER PUBLICATIONS

Decision to Grant a Patent issued in corresponding Japanese Application No. 2015-501902, dated May 31, 2016 (6 pages).

(Continued)

*Primary Examiner* — Dieu Minh T Le
(74) *Attorney, Agent, or Firm* — Chamberlain, Hrdlicka, White, Williams & Aughtry (57) ABSTRACT

In general, embodiments of the technology relate to a method for storing data. More specifically, the method may include selecting a first RAID grid location in a RAID grid, where the first RAID grid location is flagged, selecting a second RAID grid location in the RAID grid, making a first determination that the second RAID grid location is not flagged, in response to the first determination, loading first data associated with the second RAID grid location into a cache, calculating a parity value for a corresponding set of RAID grid locations in a data grid using the first data in the cache, where the first RAID grid location and the second RAID grid location are in the set of RAID grid locations, and storing at least a copy of the first data and the parity value in a storage array comprising persistent storage.

17 Claims, 9 Drawing Sheets

(56) References Cited

U.S. PATENT DOCUMENTS

| | | |
|---|---|---|
| 7,752,389 B1 | 7/2010 | Fan |
| 7,934,120 B2 | 4/2011 | Zohar et al. |
| 8,078,906 B2 | 12/2011 | Yochai et al. |
| 8,145,840 B2 | 3/2012 | Koul et al. |
| 8,200,887 B2 | 6/2012 | Bennett |
| 8,316,260 B1 | 11/2012 | Bonwick |
| 8,327,185 B1 | 12/2012 | Bonwick |
| 8,448,021 B1 | 5/2013 | Bonwick |
| 8,464,095 B1 | 6/2013 | Bonwick |
| 8,554,997 B1 | 10/2013 | Bonwick et al. |
| 8,560,772 B1 | 10/2013 | Piszczek et al. |
| 8,719,520 B1 | 5/2014 | Piszczek et al. |
| 8,725,931 B1 | 5/2014 | Kang |
| 8,924,776 B1 | 12/2014 | Mollov et al. |
| 8,977,942 B2 | 3/2015 | Wu et al. |
| 9,021,183 B2 | 4/2015 | Matsuyama et al. |
| 9,152,499 B1 * | 10/2015 | Mollov .................. G06F 3/0619 |
| 9,552,242 B1 | 1/2017 | Leshinsky et al. |
| 9,760,493 B1 | 9/2017 | Wang |
| 10,095,414 B2 | 10/2018 | Zettsu et al. |
| 2002/0161972 A1 | 10/2002 | Talagala et al. |
| 2003/0093740 A1 | 5/2003 | Stojanovic |
| 2004/0153961 A1 | 8/2004 | Park et al. |
| 2004/0177219 A1 | 9/2004 | Meehan et al. |
| 2004/0225926 A1 | 11/2004 | Scales et al. |
| 2005/0166083 A1 | 7/2005 | Frey et al. |
| 2005/0223156 A1 | 10/2005 | Lubbers et al. |
| 2005/0229023 A1 | 10/2005 | Lubbers et al. |
| 2006/0085594 A1 | 4/2006 | Roberson et al. |
| 2006/0112261 A1 | 5/2006 | Yourst et al. |
| 2006/0190243 A1 | 8/2006 | Barkai et al. |
| 2007/0061383 A1 | 3/2007 | Ozawa et al. |
| 2008/0109602 A1 | 5/2008 | Ananthamurthy et al. |
| 2008/0120484 A1 | 5/2008 | Zhang et al. |
| 2008/0168225 A1 * | 7/2008 | O'Connor ............ G06F 11/1088 711/114 |
| 2009/0187786 A1 | 7/2009 | Jones et al. |
| 2010/0005364 A1 | 1/2010 | Higurashi et al. |
| 2010/0082540 A1 | 4/2010 | Isaacson et al. |
| 2010/0199125 A1 | 8/2010 | Reche |
| 2011/0055455 A1 | 3/2011 | Post et al. |
| 2011/0258347 A1 | 10/2011 | Moreira et al. |
| 2012/0030425 A1 | 2/2012 | Becker-Szendy et al. |
| 2012/0079318 A1 * | 3/2012 | Colgrove .............. G06F 3/0688 714/6.22 |
| 2012/0089778 A1 | 4/2012 | Au et al. |
| 2012/0166712 A1 | 6/2012 | Lary |
| 2012/0297118 A1 | 11/2012 | Gorobets et al. |
| 2012/0303576 A1 | 11/2012 | Calder et al. |
| 2012/0324156 A1 | 12/2012 | Muralimanohar et al. |
| 2013/0151754 A1 | 6/2013 | Post et al. |
| 2015/0324387 A1 | 11/2015 | Squires |
| 2016/0132432 A1 | 5/2016 | Shen et al. |
| 2016/0210060 A1 | 7/2016 | Dreyer |
| 2016/0320986 A1 | 11/2016 | Bonwick |
| 2017/0192889 A1 | 7/2017 | Sato et al. |
| 2017/0255405 A1 | 9/2017 | Zettsu et al. |
| 2017/0285945 A1 | 10/2017 | Kryvaltsevich |
| 2017/0300249 A1 | 10/2017 | Geml et al. |
| 2017/0329675 A1 | 11/2017 | Berger et al. |
| 2017/0351604 A1 | 12/2017 | Tang et al. |
| 2018/0267897 A1 | 9/2018 | Jeong |

FOREIGN PATENT DOCUMENTS

| | | |
|---|---|---|
| JP | 2010-508604 A | 3/2010 |
| WO | 2008/054760 A2 | 5/2008 |

OTHER PUBLICATIONS

Minoru Uehara; "Orthogonal RAID with Multiple Parties in Virtual Large-Scale Disks"; IPSJ SIG Technical Report; vol. 2011-DPS-149; No. 4; Nov. 24, 2011 (8 pages).

H. Peter Anvin; "The mathematics of RAID-6"; http://kernel.org/pub/linux/kernel/people/hpa/raid6.pdf (last visited Nov. 15, 2017) (9 pages).

Amber Huffman; "NVM Express: Revision 1.0b"; Jul. 12, 2011 (126 pages).

Akber Kazmi; "PCI Express™ Basics & Applications in Communication Systems"; PCI-SIG Developers Conference; 2004 (50 pages).

Derek Percival; "Multicast Over PCI Express®," PCI-SIG Developers Conference Europe; 2009 (33 pages).

Jack Regula; "Using Non-transparent Bridging in PCI Express Systems"; PLX Technology, Inc.; Jun. 1, 2004 (31 pages).

* cited by examiner

RAID Cube 400

METHOD AND SYSTEM FOR IMPLEMENTING MULTI-DIMENSIONAL RAID IN AN EXTENSIBLE STORAGE ARRAY TO OPTIMIZE PERFORMANCE

BACKGROUND

In order to protect against potential loss of data in a storage system, it is often advantageous to implement a replication scheme. Current replication schemes are only able to sustain a limited amount of error before data within the storage system is unable to be read.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-7, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology relate to a method and system for replicating data using a multi-dimensional RAID scheme. More specifically, embodiments of the technology provide a method and system for implementing a 2D RAID scheme and a 3D RAID scheme in a storage array in which one or more storage modules are not present in the storage array. For example, consider a scenario in which the storage array may include up to 36 storage modules; however, when the storage array is initially implemented only 18 storage modules are used. Embodiments of the technology enable more efficient calculation of parity values (e.g., P and Q) in such scenarios. Said another way, embodiments of the technology enable implementation of a multi-dimensional RAID scheme in a storage array in which all storage modules the storage array is design to accommodate are not present. Implementations of various embodiments of the technology may result in fewer cache memory loads (i.e., less data being loaded into cache memory), fewer computation cycles, and, as a result, increase the performance of the storage array. In various embodiments of the technology, performance of the storage array may improvement up to 46%.

For purposes of this technology, the term "RAID" as used herein refers to "Redundant Array of Independent Disks." While "RAID" refers to any array of independent disks, embodiments of the technology may be implemented using any type of persistent storage device where the RAID grid locations (see e.g., FIG. 2) may be distributed across one or more persistent storage devices based on the implementation of technology.

Using a 2D RAID scheme, the data stored within a RAID grid implementing such a RAID scheme may be recovered when there are more than two errors in a given RAID stripe. Similarly, using a 3D RAID scheme, the data stored within a RAID cube implementing such a RAID scheme may be recovered when there are more than two errors in a given RAID stripe.

In one or more embodiments of the technology, an IFD corresponds to a failure mode which results in the data at a given location being inaccessible. Each IFD corresponds to an independent mode of failure in the storage array. For example, if the data is stored in NAND flash, where the NAND flash is part of a storage module (which includes multiple NAND dies), then the IFDs may be a: (i) storage module, (ii) channel (i.e., the channel used by the storage module controller (not shown) in the storage module to write data to the NAND flash), and/or a (iii) NAND die.

Figure 1:
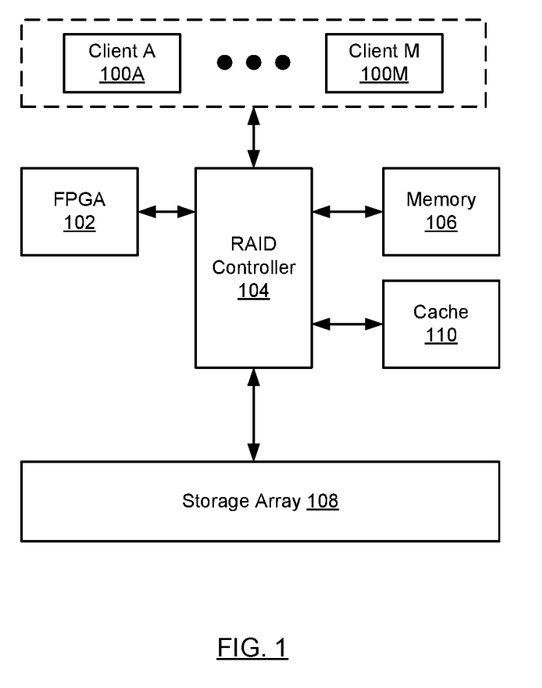
FIG. 1 shows a system in accordance with one embodiment of the technology.

FIG. 1 shows a system in accordance with one embodiment of the technology. As shown in FIG. 1, the system includes one or more clients (100A, 100M), a RAID controller (104), memory (106), an FPGA (102) (optional), a cache (110), and a storage array (108).

In one embodiment of the technology, a client (100A, 100M) is any system or process executing on a system that includes functionality to issue a read request or a write request to the RAID controller (104). In one embodiment of the technology, the clients (100A, 100M) may each include a processor (not shown), memory (not shown), and persistent storage (not shown). In one embodiment of the technology, the RAID controller (104) is configured to implement the multi-dimensional RAID scheme, which includes writing data to the storage array in a manner consistent with the multi-dimensional RAID scheme (see FIGS. 6A-6B) and reading data (including reconstructing data) from the storage array in a manner consistent with the multi-dimensional RAID scheme. In one embodiment of the technology, the RAID controller (104) includes a processor configured to execute instructions to implement one or more embodiments of the technology, where the instructions are stored on a non-transitory computer readable medium (not shown) that is located within or that is operatively connected to the RAID controller (104). Alternatively, the RAID controller (104) may be implemented using hardware. Those skilled in the art will appreciate that the RAID controller (104) may be implemented using any combination of software and/or hardware.

In one embodiment of the technology, the RAID controller (104) is operatively connected to memory (106). The memory (106) may be any volatile memory including, but not limited to, Dynamic Random-Access Memory (DRAM), Synchronous DRAM, SDR SDRAM, and DDR SDRAM. In one embodiment of the technology, the memory (106) is configured to temporarily store various data (including parity data) prior to such data being stored in the storage array.

In one embodiment of the technology, the FPGA (102) (if present) includes functionality to calculate P and/or Q parity information for purposes of storing data in the storage array (108) and/or functionality to perform various calculations necessary to recover corrupted data stored using the multi-dimensional RAID scheme. The RAID controller (104) may use the FPGA (102) to offload the processing of various data in accordance with one or more embodiments of the technology. In one embodiment of the technology, the storage array (108) includes a number of individual persistent storage devices including, but not limited to, magnetic memory devices, optical memory devices, solid state memory devices, phase change memory devices, any other suitable type of persistent memory device, or any combination thereof.

In one embodiment of the technology, the cache (110) is volatile memory that is configured to temporarily store various data (including parity values). The cache (110) is configured to store less data (including parity values) than the memory (106); however, the cache (110) has a lower read and write latency than the memory (106). In one embodiment of the technology, the cache (110) is a multi-level cache. While FIG. 1 shows the cache as separate from the RAID controller (104), the cache (110) may be an on-chip cache located the same chip as the processor (not shown). In one embodiment of the technology, the cache (110) may not concurrently store the entire RAID Grid or all parity values for the RAID Grid (see e.g., FIG. 2, 204-212); rather, in such embodiments, the cache (108) may only concurrently store a subset of the values (including data values, and parity values) in the RAID Grid.

Those skilled in the art will appreciate that while FIG. 1 shows an FPGA, the technology may be implemented without an FPGA. Further, those skilled in the art will appreciate that other components may be used in place of the FPGA without departing from the technology. For example, the technology may be implemented using an ASIC(s), a graphics processing unit(s) (GPU), a general purpose processor(s), any other hardware device capable of calculating P and/or Q parity information for purposes of storing data in the storage array and/or performing various calculations necessary to recover corrupted data stored using the multi-dimensional RAID scheme, any devices that includes a combination of hardware, firmware, and/or software configured to calculate P and/or Q parity information for purposes of storing data in the storage array (108) and/or to perform various calculations necessary to recover corrupted data stored using the multi-dimensional RAID scheme, or any combination thereof.

Figure 2:
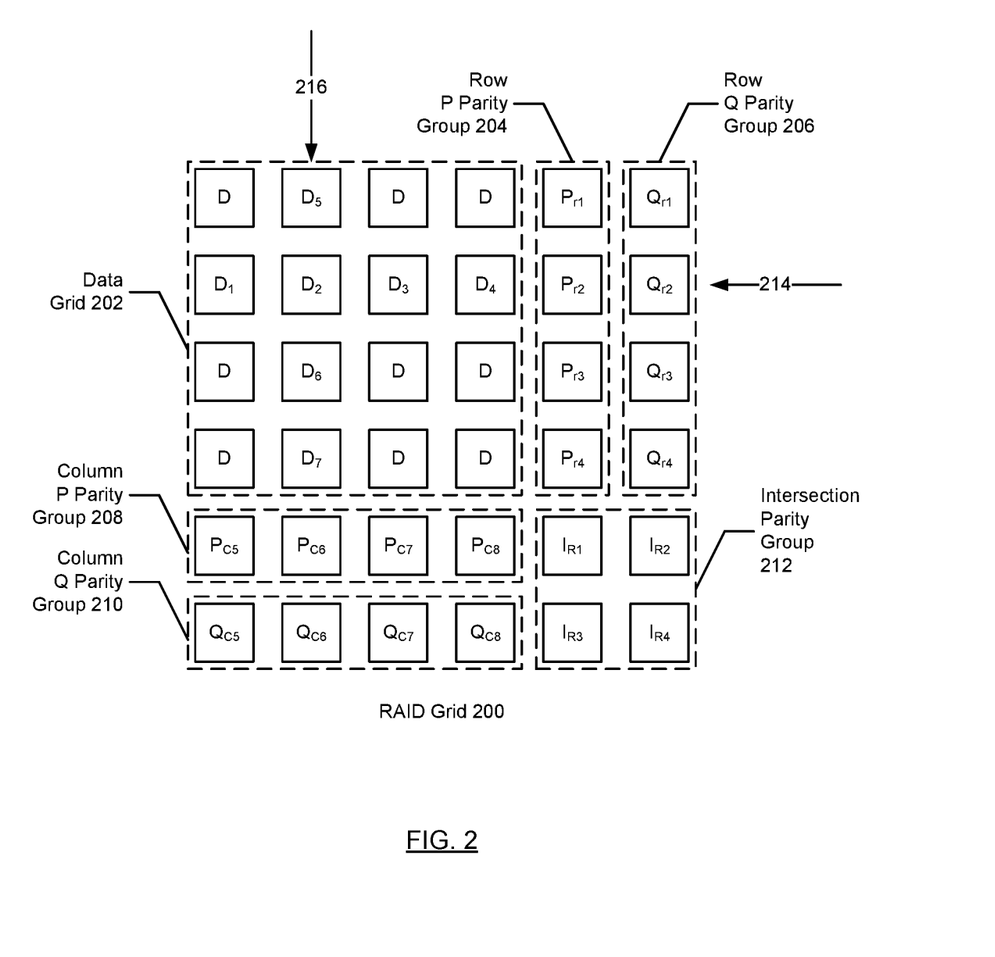
FIG. 2 shows a RAID grid in accordance with one embodiment of the technology.

FIG. 2 shows a RAID grid in accordance with one embodiment of the technology. In one embodiment of the technology, if the RAID controller implements a 2D RAID scheme or a 3D RAID scheme (see FIGS. 4A-4C), the RAID controller stores data in a RAID Grid (200). FIG. 2 shows the conceptual portions of a RAID grid in accordance with one or more embodiments of the technology. The RAID grid (200) includes a number of RAID grid locations, where each RAID grid location is ultimately written to a unique physical address in the storage array. The RAID grid (200) includes (i) a data grid (202), which includes RAID grid locations that store data received from the client (i.e., data that the client has instructed the RAID controller to write to the storage array); (ii) a row P parity group (204), which includes the RAID grid locations that store the P parity values calculated using data in RAID grid locations in a row (described below); (iii) a row Q parity group (206), which includes the RAID grid locations that store the Q parity values calculated using data in RAID grid locations in a row (described below); (iv) a column P parity group (208), which includes the RAID grid locations that store the P parity values calculated using data in RAID grid locations in a column (described below); (v) a column Q parity group (210), which includes the RAID grid locations that store the Q parity values calculated using data in RAID grid locations in a column (described below); and (vi) an intersection parity group (212), which includes parity values calculated using (a) data from RAID grid locations in row P parity group (204), (b) data from RAID grid locations in row Q parity group (206), (c) data from RAID grid locations in column P parity group (208), and (d) data from RAID grid locations in column Q parity group (210) (described below).

Referring to row (214), in one embodiment of the technology, the data stored in RAID grid location denoted as $P_r$ in row (214) is calculated by applying a P parity function to all RAID grid locations in the row (214) that includes data (e.g., $P_r = f_P(D_1, D_2, D_3, D_4)$). Similarly, in one embodiment of the technology, the data stored in RAID grid location denoted as $Q_r$ in row (214) is calculated by applying a Q parity function to all RAID grid locations in the row (214) that includes data (e.g., $Q_r = f_Q(D_1, D_2, D_3, D_4)$).

Referring to column (216), in one embodiment of the technology, data stored in the RAID grid location denoted as $P_c$ in column (216) is calculated by applying a P parity function to all RAID grid locations in the column (216) that includes data (e.g., $P_c = f_P(D_5, D_2, D_6, D_7)$). Similarly, in one embodiment of the technology, data stored in the RAID grid location denoted by $Q_c$ in column (216) is calculated by applying a Q parity function to all RAID grid locations in the column (216) that includes data (e.g., $Q_c = f_Q(D_5, D_2, D_6, D_7)$).

Referring to the intersection parity group (212), in one embodiment of the technology, the data stored in the RAID grid location denoted as $I_{r1}$ may be calculated by applying a P parity function to all RAID grid locations in the row P Parity Group (204) or by applying a P parity function to all RAID grid locations in the column P Parity Group (208). For example, $I_{r1} = f_P(P_{r1}, P_{r2}, P_{r3}, P_{r4})$ or $I_{r1} = f_P(P_{c5}, P_{c6}, P_{c7}, P_{c8})$.

In one embodiment of the technology, the data stored in the RAID grid location denoted as $I_{r2}$ may be calculated by applying a P parity function to all RAID grid locations in the row Q Parity Group (204) or by applying a Q parity function to all RAID grid locations in the column P Parity Group (208). For example, $I_{r2} = f_P(Q_{r1}, Q_{r2}, Q_{r3}, Q_{r4})$ or $I_{r2} = f_Q(P_{c5}, P_{c6}, P_{c7}, P_{c8})$.

In one embodiment of the technology, the data stored in the RAID grid location denoted as $I_{r3}$ may be calculated by applying a P parity function to all RAID grid locations in the column Q Parity Group (210) or by applying a Q parity function to all RAID grid locations in the row P Parity Group (204). For example, $I_{r3} = f_P(Q_{c5}, Q_{c6}, Q_{c7}, Q_{c8})$ or $I_{r3} = f_Q(P_{r1}, P_{r2}, P_{r3}, P_{r4})$.

In one embodiment of the technology, the data stored in the RAID grid location denoted as $I_{r4}$ may be calculated by applying a Q parity function to all RAID grid locations in the column Q Parity Group (210) or by applying a Q parity function to all RAID grid locations in the row Q Parity Group (206). For example, $I_{r4}=f_Q$ ($Q_{c1}$, $Q_{c2}$, $Q_{c3}$, $Q_{c4}$) or $I_{r4}=f_Q$ ($Q_{c5}$, $Q_{c6}$, $Q_{c7}$, $Q_{c8}$).

In one embodiment of the technology, the P and Q parity functions used to calculate the values for all of parity groups may correspond to any P and Q parity functions used to implement RAID 6.

As discussed above, the RAID grid (200) shown in FIG. 2 represents the conceptual layout of a RAID grid. However, when the individual RAID grid locations are written to the storage array, the relative location of the various RAID grid locations may vary across a row and or a column. For example, referring to row (214), when the RAID grid locations within row (214) are written to the storage array, the relative location of RAID grid locations that include data (denoted by "D") and the RAID grid locations that include parity data (i.e., the RAID grid locations denoted as "$P_r$" and "$Q_r$") may be as follows: <$D_1$, $D_2$, $P_{r2}$, $D_3$, $Q_{r2}$, $D_4$>, <$P_{r2}$, $Q_{r2}$, $D_1$, $D_2$, $D_3$, $D_4$>, or any other arrangement within row (214). Similarly, referring to column (216), the relative location of RAID grid locations that include data (denoted by "D") and the RAID grid locations that include parity data (i.e., the RAID grid locations denoted as "$P_c$" and "$Q_c$") may be as follows: <$D_5$, $D_2$, $D_6$, $P_{c6}$, $D_6$, $Q_{c6}$>, <$P_{c6}$, $D_5$, $D_2$, $Q_{c6}$, $D_6$, $D_7$>, or any other arrangement within column (216).

The RAID controller (or another entity in the system) may determine to which physical addresses in the storage array each of the RAID grid locations is written. This determination may be made prior to receiving any of the data (denoted as "D") for a particular RAID grid from the client. Alternatively, the determination may be made prior to writing the RAID grid locations to the storage array.

Those skilled in the art will appreciate that while FIG. 2 shows a RAID grid that is 6×6, the RAID grid may be implemented using any other dimensions without departing from the technology.

In one embodiment of the technology, the P parity value is a Reed-Solomon syndrome and, as such, the P Parity function may correspond to any function that can generate a Reed-Solomon syndrome. In one embodiment of the technology, the P parity function is an XOR function.

In one embodiment of the technology, the Q parity value is a Reed-Solomon syndrome and, as such, the Q Parity function may correspond to any function that can generate a Reed-Solomon syndrome. In one embodiment of the technology, a Q parity value is a Reed-Solomon code. In one embodiment of the technology, $Q=g^0 \cdot D_0 + g^1 \cdot D_1 + g^2 \cdot D_2 + \ldots + g^{n-1} \cdot D_{n-1}$, where Q corresponds any one of the Q parity values defined with respect to FIG. 2, g is a generator of the field, and the value of D corresponds to the data (which may include both values from the data grid and/or values from one or more rows or columns that include P or Q parity values).

Those skilled in the art will appreciate that while the RAID grid in FIG. 2 includes P and Q parity for each row and column, embodiments of the technology may be implemented using greater or fewer parity values without departing from the technology. For example, each row and column may only include a P parity value. In another example, each row and column may include three parity values. The aforementioned examples are not intended to limit the technology. In one embodiment of the technology, regardless of the number of parity values used in the implementation of the technology, each of the parity values is a Reed-Solomon syndrome.

Figure 3A:
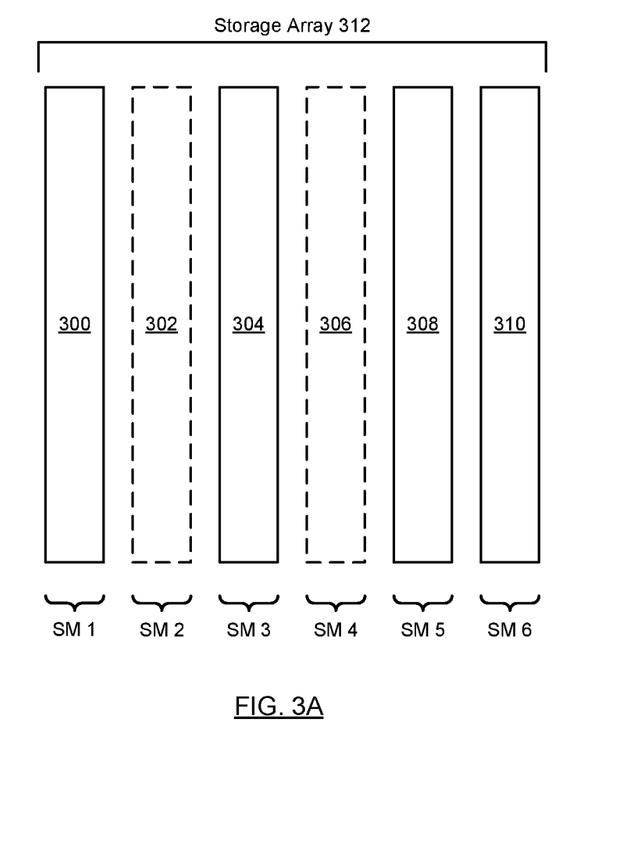
FIGS. 3A-3B show an extensible storage array with one embodiment of the technology.
Figure 3B:
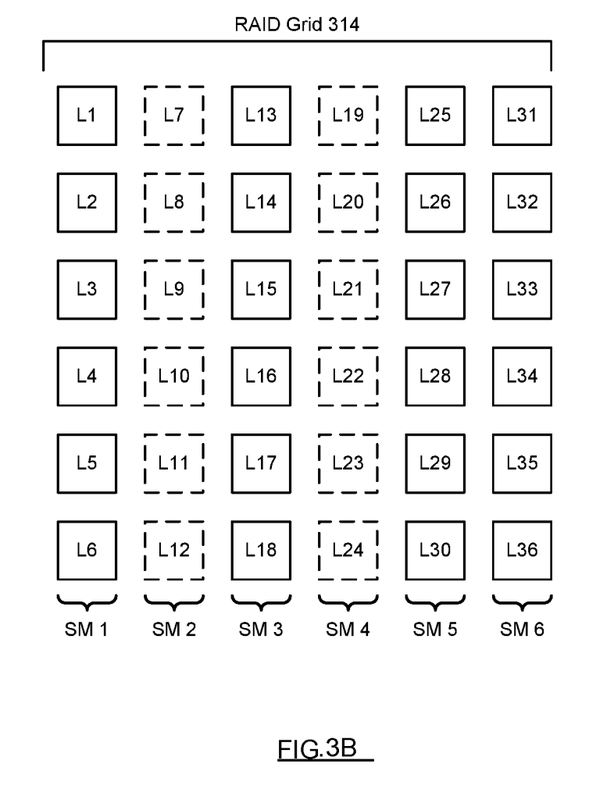

FIGS. 3A-3B show an extensible storage array with one embodiment of the technology. In one embodiment of the technology, the multi-dimensional RAID scheme is implemented using a RAID grid size which is based on all of the storage modules being present in the storage array. For example, the storage array may be designed to accommodate six storage modules. Based on this design, the RAID grid may be a 6×6 (i.e., it may have six rows and six columns, see e.g., FIG. 2). Those skilled in the art will appreciate that the technology is not limited to this example.

In certain scenarios, the storage array may include all of the storage modules that it is designed to accommodate. Continuing with the above example, while the storage module may be designed to include six storage modules only four storage modules may be present. For example, referring to FIG. 3A, the storage array (312) is designed to accommodate six storage modules; however, only four storage modules (i.e., SM 1 (300), SM 3 (304), SM 5 (308), and SM 6 (310)) are present in the storage array (312). While only four aforementioned storage modules are present, the RAID controller maintains the size of the RAID grid as if all storage modules ARE present (i.e., as if SM 2 (302) and SM 4 (306)) are present). Said another way, the RAID controller performs parity value calculations (e.g., calculations of P and Q parity) assuming that all storage modules as present in the storage array.

In one embodiment of the technology, the RAID controller (FIG. 1, 104) includes functionality to: (i) track which storage modules are present and (ii) track which storage modules bays (not shown) in the storage appliance) are empty. This information may be tracked using one or more in-memory data structures stored in the memory (106). In addition, the RAID controller includes functionality to associate each RAID grid location in a RAID grid with either: (i) a physical address corresponding to a physical location in a storage module or (ii) a flag (described below).

In one embodiment of the technology, each column (or row) in the RAID grid may be associated with a particular storage module bay. For example, the storage module inserted into storage module bay 1 may be identified as SM 1 and associated with RAID grid locations in column 1 of the RAID grid (e.g., L1-L6 in FIG. 3B). Continuing with the example, the RAID grid locations for column 2 of the RAID grid may be associated with the storage module that is inserted into storage module bay 2; however, if there is no storage module inserted in to storage module bay 2, then the RAID grid locations associated with column 2 (e.g., L7-L12) may be flagged (as described below). Those skilled in the art will appreciate that the technology is not limited to the aforementioned mapping scheme. Rather, embodiments of the technology may be implemented using any scheme in which RAID grid locations are mapped to storage modules or flagged (as discussed above).

FIG. 3B shows an example of how RAID grid locations (L1-L36) may be associated with a storage module and/or flagged in accordance with one or more embodiments of the technology.

Turning to FIG. 3B, consider a scenario in which the RAID grid (314) is a 6×6 RAID grid with 36 RAID grid locations. Each of these RAID grid locations must be associated with either a storage module (i.e., a storage module in which the content of the RAID grid location (i.e., data or parity values) is stored) or with a flag, which indicates that the RAID grid location is not associated with a storage module.

Based on the above scenario, RAID grid locations L1-L6 are associated with SM 1, RAID grid locations L13-L18 are associated with SM 3, RAID grid locations L25-L30 are associated with SM 5, and RAID grid locations L31-L36 are associated with SM 6. Further, RAID grid locations L7-L12 and L19-L24 are flagged, signifying that they are not associated with a storage module that is present in the storage array.

Figure 4A:
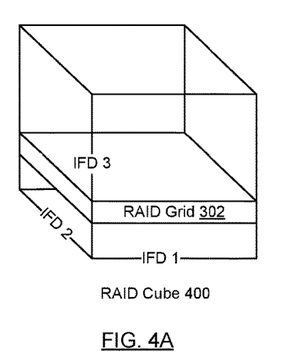
FIGS. 4A-4C show a RAID cube and various views of the RAID cube in accordance with one embodiment of the technology.
Figure 4B:
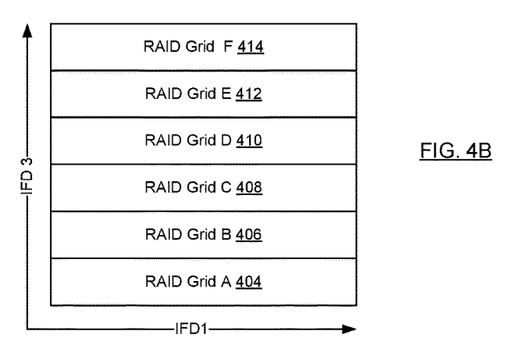
Figure 4C:
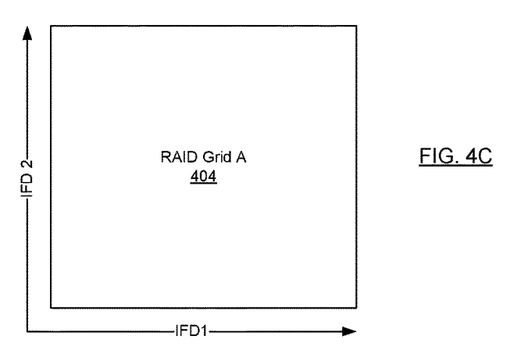

FIGS. 4A-4C shows a RAID cube and various views of the RAID cube in accordance with one embodiment of the technology. As shown in FIG. 4, a RAID cube (400) corresponds to a conceptual stack of RAID grids (402) (see e.g., FIG. 2). As discussed above, the RAID controller (or another entity in the system) selects the physical addresses within the storage array in which to store the data for each of the RAID grid locations. In one embodiment of the technology, the selection of the physical addresses may be determined in accordance with the IFDs for which the RAID grid (or RAID cube) is designed to protect against. Said another way, the physical addresses may be selected in a manner to protect against failures in one or more IFDs. For example, as shown in FIG. 4, each RAID grid location (not shown) for a given RAID grid (402, 404) is written to a physical address (or will be written to a physical address) in the storage array (not shown) that is selected using a unique pair of values from IFD 1 and IFD 2, but has the same value for IFD 3. For example, if the data in the storage array is stored in NAND flash, where the NAND flash is part of a storage module (which includes multiple NAND dies), then the IFDs may be as follows: (i) IFD 1=storage module, (ii) IFD 2=channel, and (iii) IFD 3=NAND die. Accordingly, in a given RAID grid, the data in each RAID grid location is written to a unique combination of storage module (IFD 1) and channel (IFD 2) but is written to the same NAND die (on each of the storage modules). Those skilled in the art will appreciate that the technology is not limited to the three independent fault domains described above. Further, those skilled in the art will appreciate that the technology is not limited to a storage array that includes NAND flash.

Figure 5:
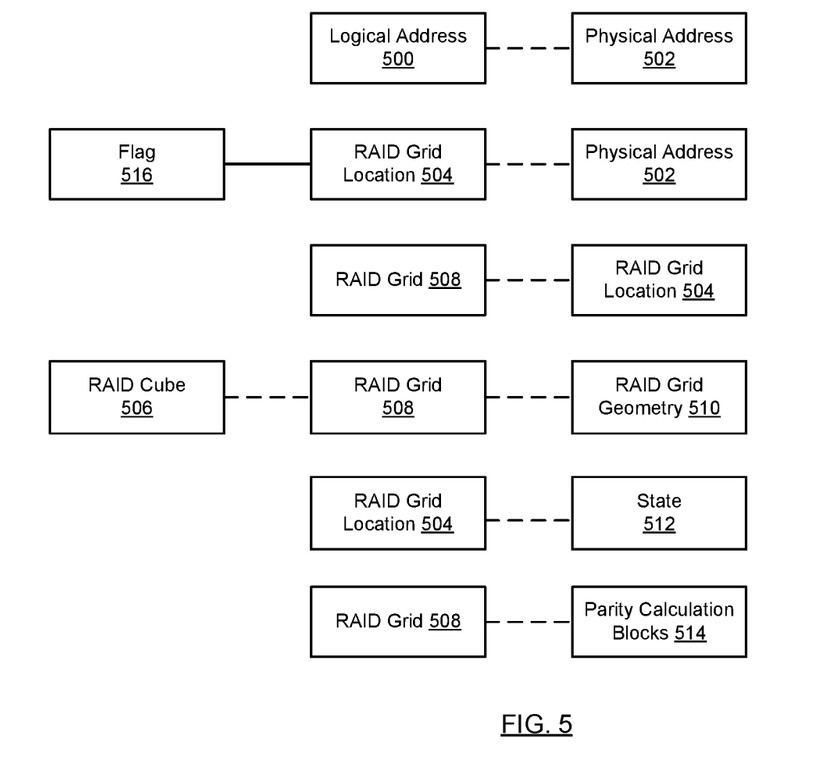
FIG. 5 shows a data structures in accordance with one embodiment of the technology.

FIG. 5 shows data structures in accordance with one embodiment of the technology. In one embodiment of the technology, the RAID controller includes one or more data structures to implement the multi-dimensional RAID schemes.

In one embodiment of the technology, the RAID controller includes a data structure that tracks the mappings between data provided by the client and the physical address of such data in the storage array. In one embodiment of the technology, the RAID controller tracks the aforementioned information using a mapping between a logical address e.g., <object, offset> (500), which identifies the data from the perspective of the client, and physical address (502), which identifies the location of the data within the storage array. In one embodiment of the technology, the mapping may be between a hash value derived from applying a hash function (e.g., MD5, SHA 1) to <object, offset>. Those skilled in the art will appreciate that any form of logical address may be used without departing the technology.

In one embodiment of the technology, the RAID controller includes a data structure that tracks how each RAID grid location (504) (see e.g., FIG. 2) is mapped to a particular physical address (502) in the storage array.

Further, the RAID controller includes a data structure that tracks whether the RAID grid location (504) is associated with a flag (516). The RAID grid location may be associated with a flag when the RAID grid location corresponds to a physical location on a storage module that is not currently present in the storage array. In such cases, the RAID grid location (504) may be associated with a flag (516) but may not be associated with a physical address (502).

In one embodiment of the technology, the RAID controller includes a data structure that tracks which RAID grid (including RAID grids in the data portion and the parity portion) (508) is associated with which RAID cube (506) (assuming that the RAID controller is implementing a 3D RAID scheme) and also which RAID grid locations (504) are associated with each RAID grid (508).

In one embodiment of the technology, the RAID controller includes a data structure that tracks the state (510) of each RAID grid location (504). In one embodiment of the technology, the state (510) of a RAID grid location may be set as filled (denoting that data (or parity data) has been written to the RAID grid location) or empty (denoting that no data (or parity data) has been written to the RAID grid location). In one embodiment of the technology, the RAID controller may also set the state of the RAID grid location to "filled" if the RAID controller has identified data in the RAID controller to write to the RAID grid location.

In one embodiment of the technology, the RAID controller includes a data structure that tracks the RAID grid geometry. In one embodiment of the technology, the RAID grid geometry may include, but is not limited to, the size of RAID grid and the IFD associated with each dimension of the RAID grid. This data structure (or another data structure) may also track the size of the RAID cube and the IFD associated with each dimension of the RAID cube.

In one embodiment of the technology, the RAID controller includes a data structure that tracks the location of each P and Q parity value (including parity values within the intersection parity group (see e.g., FIG. 2)) within each row and/or column within each RAID grid.

In one embodiment of the technology, the RAID controller includes a data structure that tracks which RAID grid locations in the data portion of the RAID cube are used to calculate each of the P and Q parity values in the P Parity RAID grid and Q parity RAID grid, respectively.

Figure 6A:
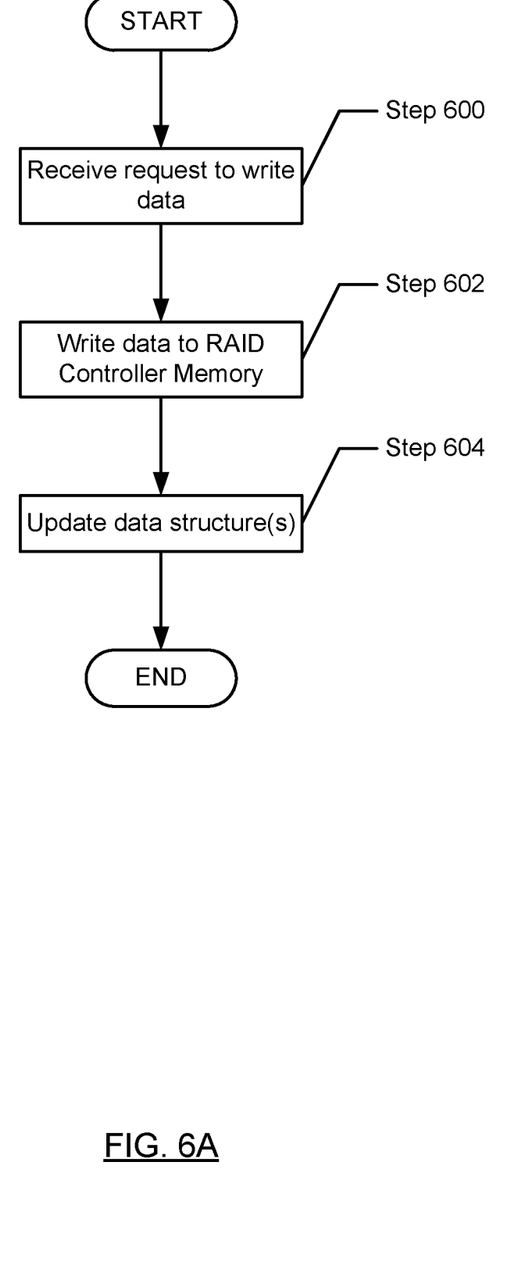
FIGS. 6A-6B show flow charts for writing data to the storage array in accordance with one embodiment of the technology.
Figure 6B:
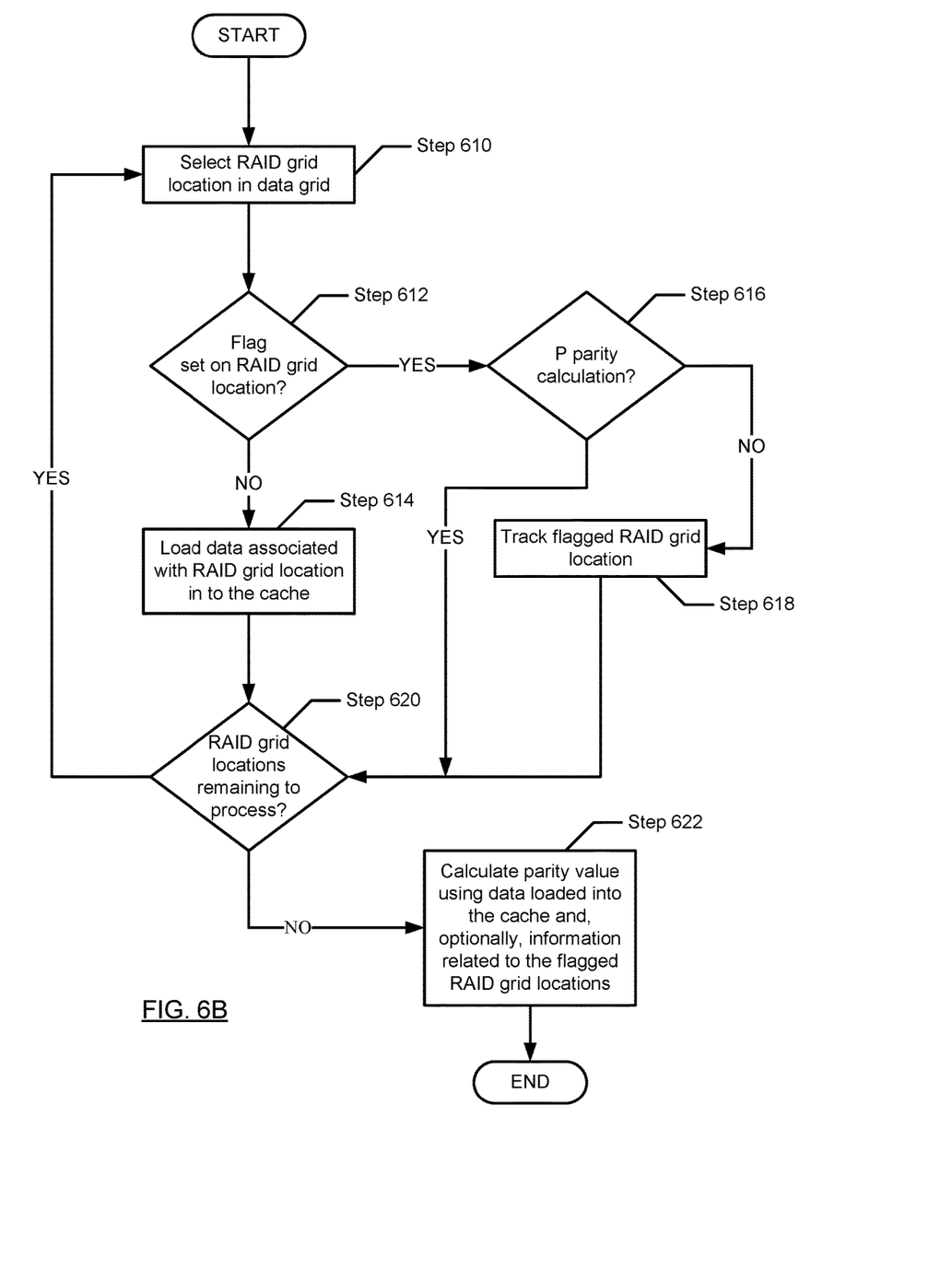

FIGS. 6A-6B show flowcharts in accordance with one or more embodiments of the technology. More specifically, FIGS. 6A-6B show a method for storing data in a storage array in accordance with one or more embodiments of the technology. While the various steps in the flowchart are presented and described sequentially, one of ordinary skill will appreciate that some or all of the steps may be executed in different orders, may be combined or omitted, and some or all of the steps may be executed in parallel. In one embodiment of the technology, the methods shown in FIGS. 6A-6B may be performed in parallel.

Referring to FIG. 6A, in step 600, a request to write data is received from the client. In one embodiment of the technology, the request includes the <object, offset> that identifies the data from the perspective of the client. In step 602, the RAID controller, in response to the request, writes the data to a location in the RAID controller memory.

In step 604, the RAID controller updates one or more of the data structures (see e.g., FIG. 5). More specifically, in one embodiment of the technology, the RAID controller may (i) select a physical address in the storage array in which to write the data received from the client (where the physical address corresponds to a physical location in a storage module that is present in the storage array) and (ii) create a mapping between the <object, offset> for the data and the selected physical address. In one embodiment of the technology, at some point prior to selecting the physical address in which to write the data, the RAID controller specifies (i) at least one RAID grid, (ii) RAID grid locations for the RAID grid, and (iii) the physical address in the storage array associated with each RAID grid location. In addition, the RAID controller may initialize the state of each RAID grid location that is not flagged to empty.

The method shown in FIG. 6A may be performed until the data grid portion of the RAID grid (see e.g., FIG. 2, 202) has been filled.

Once the data grid portion of the RAID grid has been filled, the parity values in the RAID grid are calculated. Specifically, the following parity values may be calculated $P_{r1}$, $P_{r2}$, $P_{r3}$, $P_{r4}$, $P_{c5}$, $P_{c6}$, $P_{c7}$, $P_{c8}$, $Q_{r1}$, $Q_{r2}$, $Q_{r3}$, $Q_{r4}$, $Q_{c5}$, $Q_{c6}$, $Q_{c7}$, or $Q_{c8}$.

Each of the parity values may be calculated in accordance with the method in FIG. 6B. After the parity values are calculated they are stored in the persistent storage. The specific manner in which the parity values are stored is based on the implementation of the technology.

In one embodiment of the technology, the data associated with the data grid portion of the RAID grid (see e.g., FIG. 2, 202) may be stored in the persistent storage prior to the storage of the parity values. In another embodiment of the technology, the data associated with the data grid portion of the RAID grid may be stored after the parity values have been calculated. The data associated with the data grid portion of the RAID grid may be stored any other point in time without departing from the technology.

FIG. 6B shows a method for calculating parity values in accordance with one or more embodiments of the technology.

In step 610, a RAID grid location in the data grid is selected. The selected RAID grid location is a RAID grid location in the data grid that may be associated with data to be used in the parity value calculation. Said another way, the selected RAID grid location is a location in the data grid that is associated with data or that is flagged.

In step 612, a determination is made about whether the selected RAID grid location is flagged. If the RAID grid location is flagged, the process proceeds to step 630; otherwise, the process proceeds to step 614.

If the RAID grid location is not flagged, then in step 614, data associated with the RAID grid location is loaded from the memory (FIG. 1, 106) into the cache (FIG. 1, 110). The process then proceeds to step 620.

If the RAID grid location is flagged, then in step 616, a determination is made about whether the parity value being calculated in a P parity value. If the parity value being calculated is a P parity value (e.g., FIG. 2, $P_{r1}$), then the process proceeds to step 620; otherwise, the process proceeds to step 618.

More specifically, for purposes of parity value calculations, any RAID grid location that is flagged is associated with a value of zero. A value of zero in the P parity value calculation does not change the resulting P parity value that is calculated. Accordingly, if the parity value being calculated is a P parity value, then the flagged RAID grid location may be ignored (or otherwise not considered) in the P parity value calculation. However, if the parity value being calculated is a Q parity value (e.g., FIG. 2, $Q_{r1}$), then a value of zero for the flagged RAID grid location must be used in order to calculate the Q parity value. Accordingly, in these scenarios, the RAID controller tracks the flagged RAID grid location. This information (also referred to as tracking information) is subsequently used to calculate the Q parity value.

In step 618, the flagged RAID grid location is tracked. Said another way, tracking information is generated and/or updated. The tracking information may be maintained in the cache, in a hardware register associated with the processor, and/or using any other mechanism that may be used to store the tracking information. The process then proceeds to step 620.

In step 620, a determination is made about whether there are any additional RAID grid locations to be processed in order to calculate the parity value. If there are additional RAID grid locations to process, the method proceeds to step 610; otherwise, the method proceeds to step 622.

In step 622, if the parity value being calculated is a P parity value, then the P parity value is calculated using the data loaded into the cache. However, if the parity value being calculated is a Q parity value, then the Q parity value is calculated using the data loaded into the cache in combination with the tracking information. More specifically, in one embodiment of the technology, the RAID controller includes functionality to use the tracking information to appropriately calculate the Q parity value by using the tracking information to identify which RAID grid locations should be associated with a value of zero for purposes of the Q parity value calculation.

Figure 7:
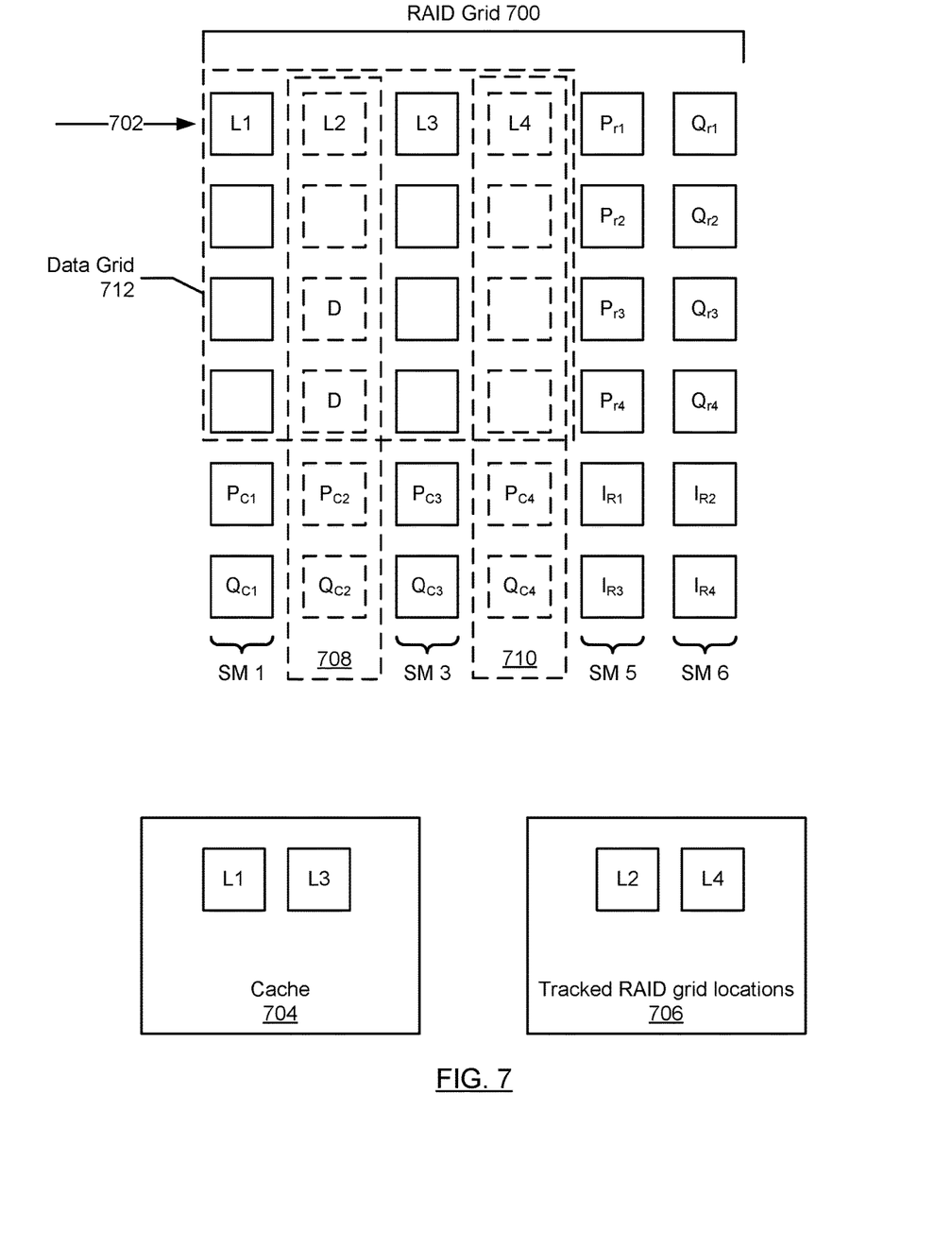
FIG. 7 shows an example in accordance with one or more embodiments of the technology.

FIG. 7 shows an example of populating a RAID grid in accordance with one or more embodiments of the technology. The example is not intended to limit the scope of the technology.

Consider a scenario in which the storage array corresponds to the storage array shown in FIG. 3A where only four (SM 1, SM 3, SM 5, and SM 6) of the six storage modules are present in the storage array. Further, for purposes of this example, assume that the RAID controller uses a RAID grid size of 6×6.

Turning to the example, when the storage array is initialized the RAID controller detects that only four of the six storage modules are present. Based on this detection, when the RAID controller initializes the RAID grid (700), it flags one set of RAID grid locations (708, 710) as not being associated with any storage module. Further, the RAID controller associates the non-flagged RAID grid locations with one of the storage modules (e.g., with one of SM 1, SM 3, SM 5, and SM 6).

Once the data grid has been filled (i.e., all non-flagged RAID grid locations in the data grid (712) have been associated with data), the RAID controller initiates the calculation of parity values. This example focuses on the parity value calculation of $P_{r1}$ and $Q_{r1}$.

With respect to calculating $P_{r1}$, the RAID grid locations (L1-L4) in the same row (702) as the $P_{r1}$ are processed in accordance with FIG. 6B. More specifically, the data associated with L1 and L3 are loaded into the cache (704). However, because the parity value calculation for $P_{r1}$ is a P parity calculation no values related to RAID grid locations L2 and L4 are loaded in to the cache and, as such, are not considered during the calculation of $P_{r1}$.

With respect to calculating $Q_{r1}$, the RAID grid locations (L1-L4) in the same row (702) as the $Q_{r1}$ are processed in accordance with FIG. 6B. More specifically, the data associated with L1 and L3 are loaded into the cache (704) (assuming that they are not already present in the cache). Further, because the parity value calculation for $Q_{r1}$ is a Q parity calculation, tracking information (706) is generated for L2 and L4. When the Q parity calculation is performed, the data in the cache (i.e., the data associated with L1 and L3) are used in combination with the tracking information for L2 and L4. However, even though there is tracking information maintained for L2 and L4, a value of zero is not loaded into the cache. Rather, a function may be executed each time a value of zero is required for the Q parity value calculation, where the result of executing the function produces the same results as if the value of zero have been loaded into the cache and subsequently used.

Embodiments of the technology enable the calculation of a P and Q parity values in a manner that limits the amount of loads and computation cycles required by the processor. The limited number of required cache loads is enabled by the detection of the presence and/or absence of various storage modules in combination with optimizations related to P and Q parity value calculations.

Those skilled in the art will appreciate that while various examples of the technology has been described with respect to storing data in a storage array along IFDs and/or storing data in NAND flash, embodiments of the technology may be implemented on any multi-dimensional disk array without departing from the technology. For example, one or more embodiments of the technology may be implemented using a two dimensional array of disks (magnetic, optical, solid state, or any other type of storage device), where data for each RAID grid location in a RAID grid is stored on a separate disk.

Further, in one embodiment of the technology, in the event that the RAID controller is implementing a 3D RAID scheme using a two dimensional array of disks, the RAID controller may store data for each of the RAID grid locations using the following n-tuple: <disk x, disk y, logical block address (LBA) z>, where x and y are the dimensions of the disk array. Further, for a given RAID grid the LBA is constant for each RAID grid location for a single RAID grid; however, the LBA is different across the RAID grids in the RAID cube.

The above examples for implementing embodiments of the technology using a two-dimensional disk array are not intended to limit the scope of the technology.

Those skilled in the art will appreciate that while the technology has been described with respect to a 2D RAID scheme and a 3D RAID scheme, embodiments of the technology, may be extended to any multi-dimensional RAID scheme.

One or more embodiments of the technology may be implemented using instructions executed by one or more processors in the system. Further, such instructions may correspond to computer readable instructions that are stored on one or more non-transitory computer readable mediums.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for storing data comprising:
   selecting a first RAID grid location in a RAID grid, wherein the first RAID grid location is flagged;
   selecting a second RAID grid location in the RAID grid;
   making a first determination that the second RAID grid location is not flagged;
   in response to the first determination, loading first data associated with the second RAID grid location into a cache;
   calculating a parity value for a corresponding set of RAID grid locations in a data grid using the first data in the cache, wherein the first RAID grid location and the second RAID grid location are in the set of RAID grid locations; and
   storing at least a copy of the first data and the parity value in a storage array comprising persistent storage;
   wherein prior to selecting the first RAID grid location:
      identifying a set of storage modules that are present in the storage array;
      making a second determination that at least one storage module is not present in the storage array;
      in response to the second determination:
         specifying that the first RAID grid location is a RAID grid location that is not associated with any of the set of storage modules; and
         in response to the specifying, associating the first RAID grid location with a flag.

2. The method of claim 1, further comprising:
   selecting a third RAID grid location in the RAID grid
   making a second determination that the third RAID grid location is flagged;
   in response to the second determination, generating tracking information specifying that the third RAID grid location is flagged;
   selecting a fourth RAID grid location in the RAID grid;
   making a third determination that the fourth RAID grid location is not flagged;
   in response to the third determination, loading third data associated with the fourth RAID grid location into the cache;
   calculating a second parity value for a corresponding second set of RAID grid locations in the data grid using the second data in the cache and the tracking information, wherein the third RAID grid location and the fourth RAID grid location are in the second set of RAID grid locations; and
   storing at least a copy of the second data and the second parity value in the storage.

3. The method of claim 2, wherein the second parity value is a Q parity value.

4. The method of claim 1, wherein the second RAID grid location is associated with a physical location in a storage module of the set of storage modules in the storage array.

5. The method of claim 1, wherein the first parity value is a P parity value.

6. The method of claim 1, wherein the persistent storage is solid state memory.

7. A non-transitory computer readable medium comprising computer readable program code, which when executed by a computer processor enables the computer processor to:
   select a first RAID grid location in a RAID grid, wherein the first RAID grid location is flagged;
   select a second RAID grid location in the RAID grid;
   make a first determination that the second RAID grid location is not flagged;
   in response to the first determination, load first data associated with the second RAID grid location into a cache;
   calculate a parity value for a corresponding set of RAID grid locations in a data grid using the first data in the cache, wherein the first RAID grid location and the second RAID grid location are in the set of RAID grid locations; and
   store at least a copy of the first data and the parity value in a storage array comprising persistent storage;
   wherein prior to selecting the first RAID grid location:

identify a set of storage modules that are present in the storage array;
make a second determination that at least one storage module is not present in the storage array;
in response to the second determination,
specify that the first RAID grid location is a RAID grid location that is not associated with any of the set of storage modules; and
in response to the specifying, associate the first RAID grid location with a flag.

8. The non-transitory computer readable medium of claim 7 further comprising computer readable program code, which when executed by the computer processor enables the computer processor to:
select a third RAID grid location in the RAID grid;
make a second determination that the third RAID grid location is flagged;
in response to the second determination, generate tracking information specifying that the third RAID grid location is flagged;
select a fourth RAID grid location in the RAID grid;
make a third determination that the fourth RAID grid location is not flagged;
in response to the third determination, load third data associated with the fourth RAID grid location into the cache;
calculate a second parity value for a corresponding second set of RAID grid locations in the data grid using the second data in the cache and the tracking information, wherein the third RAID grid location and the fourth RAID grid location are in the second set of RAID grid locations; and
store at least a copy of the second data and the second parity value in the storage.

9. The non-transitory computer readable medium of claim 8, wherein the second parity value is a Q parity value.

10. The non-transitory computer readable medium of claim 7, wherein the second RAID grid location is associated with a physical location in a storage module of the set of storage modules in the storage array.

11. The non-transitory computer readable medium of claim 7, wherein the first parity value is a P parity value.

12. The non-transitory computer readable medium of claim 7, wherein the persistent storage is solid state memory.

13. A system comprising:
a persistent storage;
a processor;
a non-transitory computer readable medium comprising computer readable program code, which when executed by the processor enables the processor to:
select a first RAID grid location in a RAID grid, wherein the first RAID grid location is flagged;
select a second RAID grid location in the RAID grid;
make a first determination that the second RAID grid location is not flagged;
in response to the first determination, load first data associated with the second RAID grid location into a cache;
calculate a parity value for a corresponding set of RAID grid locations in a data grid using the first data in the cache, wherein the first RAID grid location and the second RAID grid location are in the set of RAID grid locations; and
store at least a copy of the first data and the parity value in a storage array comprising persistent storage;
wherein prior to selecting the first RAID grid location:
identify a set of storage modules that are present in the storage array;
make a second determination that at least one storage module is not present in the storage array;
in response to the second determination,
specify that the first RAID grid location is a RAID grid location that is not associated with any of the set of storage modules; and
in response to the specifying, associate the first RAID grid location with a flag.

14. The system of claim 13, further comprising computer readable program code, which when executed by the computer processor enables the computer processor to:
select a third RAID grid location in the RAID grid;
make a second determination that the third RAID grid location is flagged;
in response to the second determination, generate tracking information specifying that the third RAID grid location is flagged;
select a fourth RAID grid location in the RAID grid;
make a third determination that the fourth RAID grid location is not flagged;
in response to the third determination, load third data associated with the fourth RAID grid location into the cache;
calculate a second parity value for a corresponding second set of RAID grid locations in the data grid using the second data in the cache and the tracking information, wherein the third RAID grid location and the fourth RAID grid location are in the second set of RAID grid locations; and
store at least a copy of the second data and the second parity value in the storage.

15. The system of claim 14, wherein the second parity value is a Q parity value.

16. The system of claim 13, wherein the second RAID grid location is associated with a physical location in a storage module of the set of storage modules in the storage array.

17. The system of claim 13, wherein the first parity value is a P parity value.

* * * * *